United States Patent [19]
Furuyama

[11] Patent Number: 5,897,216
[45] Date of Patent: Apr. 27, 1999

[54] REPRODUCING APPARATUS HAVING EDITING FUNCTION

[75] Inventor: Hiroaki Furuyama, Tachikawa, Japan

[73] Assignee: Canon Kabushiki Kaisha, Tokyo, Japan

[21] Appl. No.: 08/921,549

[22] Filed: Sep. 2, 1997

[30] Foreign Application Priority Data

Sep. 18, 1996 [JP] Japan ..................................... 8-246160

[51] Int. Cl.⁶ .............................. H04N 5/93; G11B 27/00
[52] U.S. Cl. ................................ 386/52; 386/55; 348/734
[58] Field of Search ............................. 386/1, 4, 46, 52, 386/55; 348/731, 734; 369/83; 360/13; H04N 5/93

[56] References Cited

U.S. PATENT DOCUMENTS

| | | | |
|---|---|---|---|
| 4,668,999 | 5/1987 | De La Cierva, Sr. et al. | 360/14.1 |
| 5,148,159 | 9/1992 | Clark et al. | 340/825.22 |
| 5,204,662 | 4/1993 | Oda et al. | 340/825.25 |
| 5,343,251 | 8/1994 | Nefah | 348/571 |
| 5,365,282 | 11/1994 | Levine | 348/734 |
| 5,371,553 | 12/1994 | Kawamura et al. | 348/734 |
| 5,373,330 | 12/1994 | Levine | 348/734 |
| 5,386,251 | 1/1995 | Movshovich | 348/734 |
| 5,388,197 | 2/1995 | Rayner | 395/154 |
| 5,412,377 | 5/1995 | Evans et al. | 340/825.22 |
| 5,436,676 | 7/1995 | Pint et al. | 348/734 |
| 5,448,370 | 9/1995 | Kim et al. | 358/335 |
| 5,469,270 | 11/1995 | Yamamoto | 358/335 |
| 5,526,125 | 6/1996 | Mori et al. | 358/311 |
| 5,539,391 | 7/1996 | Yuen | 340/825.72 |
| 5,548,345 | 8/1996 | Brian et al. | 348/734 |
| 5,657,414 | 8/1997 | Lett et al. | 386/35 |

*Primary Examiner*—Andrew I. Faile
*Assistant Examiner*—Vincent F. Boccio
*Attorney, Agent, or Firm*—Robin, Blecker & Daley

[57] ABSTRACT

In a reproducing apparatus having an editing function arranged to permit an editing recording operation to be performed according to an editing program by using another apparatus which is remotely controllable, there is provided an action control command selection mode in which, when action control commands applicable to the other apparatus connected to the reproducing apparatus are to be selected for transmission, a plurality of kinds of action control command codes are serially and continuously selected one after another at intervals of a constant period of time sufficiently long for verifying whether the selected action control command code is applicable to the other apparatus connected to the reproducing apparatus to perform an accurate remote control over the other apparatus, and an action control command for commanding a predetermined action in each of the plurality of kinds of action control command codes during the period of each selection is automatically transmitted a plurality of times, so that the action control commands to be transmitted to the other apparatus connected to the reproducing apparatus can be simply and accurately selected without any complex operation.

14 Claims, 3 Drawing Sheets

REPRODUCING APPARATUS HAVING EDITING FUNCTION

BACKGROUND OF THE INVENTION

1. Field of the Invention

The present invention relates to a reproducing apparatus having an editing function of editing, by using another apparatus which is remotely controllable, a signal recorded on a recording medium.

2. Description of Related Art

There is known a dubbing editing system for performing editing by reproducing a video signal recorded on a recording medium such as a video tape with a reproducing apparatus such as a video tape recorder (hereinafter referred to as VTR) and by dubbing (recording) the video signal with another recording apparatus such as a VTR.

Some of the dubbing editing systems of the kind mentioned above have recently come to be arranged as follows. A remote control signal transmitting part of an infrared remote control device is incorporated within the VTR disposed on the side of sending signals. A plurality of control command codes corresponding respectively to different manufacturers or different kinds of VTRs are stored. A control command code usable for remote control over the operation of the VTR disposed on the side of receiving signals (hereinafter referred to as the partner VTR or the other apparatus) is selected from the plurality of control command codes. Then, actions of the partner VTR are controlled by sending control commands conforming to the selected control command code from the infrared remote control transmitting part of the VTR to the partner VTR.

In the above-stated arrangement of the conventional dubbing editing system, during the initial setting operation thereof, in order to transmit control commands applicable to the partner VTR, it is necessary to select a control command code corresponding to the kind or manufacturers of the partner VTR.

The process of selecting the control command code corresponding to the kind or manufacturers of the partner VTR then necessitates the operator of the dubbing editing system to perform the following verifying actions. A control command belonging to an arbitrary kind of control command code selected from the plurality of kinds of control command codes stored correspondingly to the respective kinds or manufacturers of VTRs is first transmitted to the partner VTR. Then, the operator is required to verify the correctness of the selection by making a check to find if the partner VTR correctly responds to the control command transmitted. If not, the verifying action must be repeated by transmitting a control command belonging to another kind of control command code to the partner VTR until the partner VTR correctly responds to the control command transmitted. Such a process of selecting a control command code corresponding to the manufacturers or the kind of the partner VTR and setting and transmitting a control command conforming to the selected control command code thus has caused quite troublesome operation in performing editing work.

BRIEF SUMMARY OF THE INVENTION

It is a general object of the invention to provide a reproducing apparatus having an editing function arranged to solve the above-stated problem.

It is a more specific object of the invention to provide a reproducing apparatus having an editing function arranged to permit selection of an action control command to be sent to another apparatus connected to the reproducing apparatus, in a simple manner without any complex, troublesome operation.

To attain the above objects, in accordance with an aspect of the invention, there is provided a reproducing apparatus having an editing function of editing, by using another apparatus which is remotely controllable, a signal recorded on a recording medium, which comprises (A) reproducing means for reproducing a signal recorded on the recording medium loaded on the reproducing apparatus and for outputting the reproduced signal to the other apparatus, (B) control command transmitting means for storing a plurality of kinds of action control command codes corresponding respectively to manufacturers or kinds of apparatuses usable as the other apparatus and used to remotely control the other apparatus, for selecting one kind of action control command code from the plurality of action control command codes, and for transmitting, to the other apparatus, action control commands for remotely controlling the other apparatus in accordance with the selected action control command code, and (C) control means having (i) an editing program execution control mode of allowing at least one editing program to be set, storing beforehand the set editing program, controlling the reproducing means to reproduce the signal recorded on the recording medium in accordance with the stored editing program, and controlling the control command transmitting means to perform an editing recording action in accordance with the stored editing program by using the remotely operable other apparatus, and (ii) an action control command selection mode of, when action control commands applicable to the other apparatus connected to the reproducing apparatus to be transmitted by the control command transmitting means are to be selected from a plurality of kinds of action control commands transmittable by the control command transmitting means, causing the control command transmitting means to serially and continuously select the plurality of kinds of action control command codes one after another at intervals of a constant period of time sufficiently long for verifying whether the selected action control command code is applicable to the other apparatus connected to the reproducing apparatus to perform an accurate remote control over the other apparatus, and to automatically a plurality of times transmit an action control command for commanding a predetermined action in each of the plurality of kinds of action control command codes during the period of each selection, and arranged to make an editing action executable in accordance with the editing program execution control mode after selecting action control commands to be transmitted to the other apparatus connected to the reproducing apparatus in accordance with the action control command selection mode.

It is another object of the invention to provide a recording and reproducing apparatus having an editing function arranged to permit selection of action control commands to be sent to another apparatus connected to the recording and reproducing apparatus, in a reliable manner without any faulty operation.

To attain the above object, in accordance with another aspect of the invention, there is provided a recording and reproducing apparatus arranged to pick up an image of an object and to record a video signal corresponding to the picked-up object image on a recording medium, and having an editing function of editing, by using another apparatus, a video signal recorded on the recording medium, which comprises (A) image pickup means for picking up the object image and outputting the video signal corresponding to the picked-up object image, (B) recording and reproducing means for recording the video signal outputted from the image pickup means on the recording medium loaded on the recording and reproducing apparatus, and for searching for a desired video signal recorded on the recording medium, reproducing the searched-for video signal and outputting the reproduced video signal to the other apparatus, (C) control command transmitting means for storing a plurality of kinds of action control command codes corresponding respectively to manufacturers or kinds of apparatuses usable as the other apparatus and used to remotely control the other apparatus, for selecting one kind of action control command code from the plurality of action control command codes, and for transmitting, to the other apparatus, action control commands for remotely controlling the other apparatus in accordance with the selected action control command code, (D) control means having (i) an editing program execution control mode of allowing at least one editing program to be set, storing beforehand the set editing program, controlling the recording and reproducing means to reproduce the signal recorded on the recording medium in accordance with the stored editing program, and controlling the control command transmitting means to perform an editing recording action in accordance with the stored editing program by using the remotely operable other apparatus, and (ii) an action control command selection mode of, when action control commands applicable to the other apparatus connected to the recording and reproducing apparatus to be transmitted by the control command transmitting means are to be selected from a plurality of kinds of action control commands transmittable by the control command transmitting means, causing the control command transmitting means to serially and continuously select the plurality of kinds of action control command codes one after another at intervals of a constant period of time sufficiently long for verifying whether the selected action control command code is applicable to the other apparatus connected to the recording and reproducing apparatus to perform an accurate remote control over the other apparatus, and to automatically a plurality of times transmit an action control command for commanding a predetermined action in each of the plurality of kinds of action control command codes during the period of each selection, and arranged to make an editing action executable in accordance with the editing program execution control mode after selecting action control commands to be transmitted to the other apparatus connected to the recording and reproducing apparatus in accordance with the action control command selection mode, and (E) display means for displaying a video image represented by the video signal outputted from the image pickup means or a reproduced video image represented by the video signal outputted from the recording and reproducing means, information of various kinds related to an editing program to be executed by the control means and information of various kinds related to an operating state of the recording and reproducing means.

These and other objects and features of the invention will become apparent from the following detailed description of an embodiment thereof taken in connection with the accompanying drawings.

DETAILED DESCRIPTION OF THE INVENTION

Hereinafter, a preferred embodiment of the invention will be described in detail with reference to the drawings.

Figure 1:
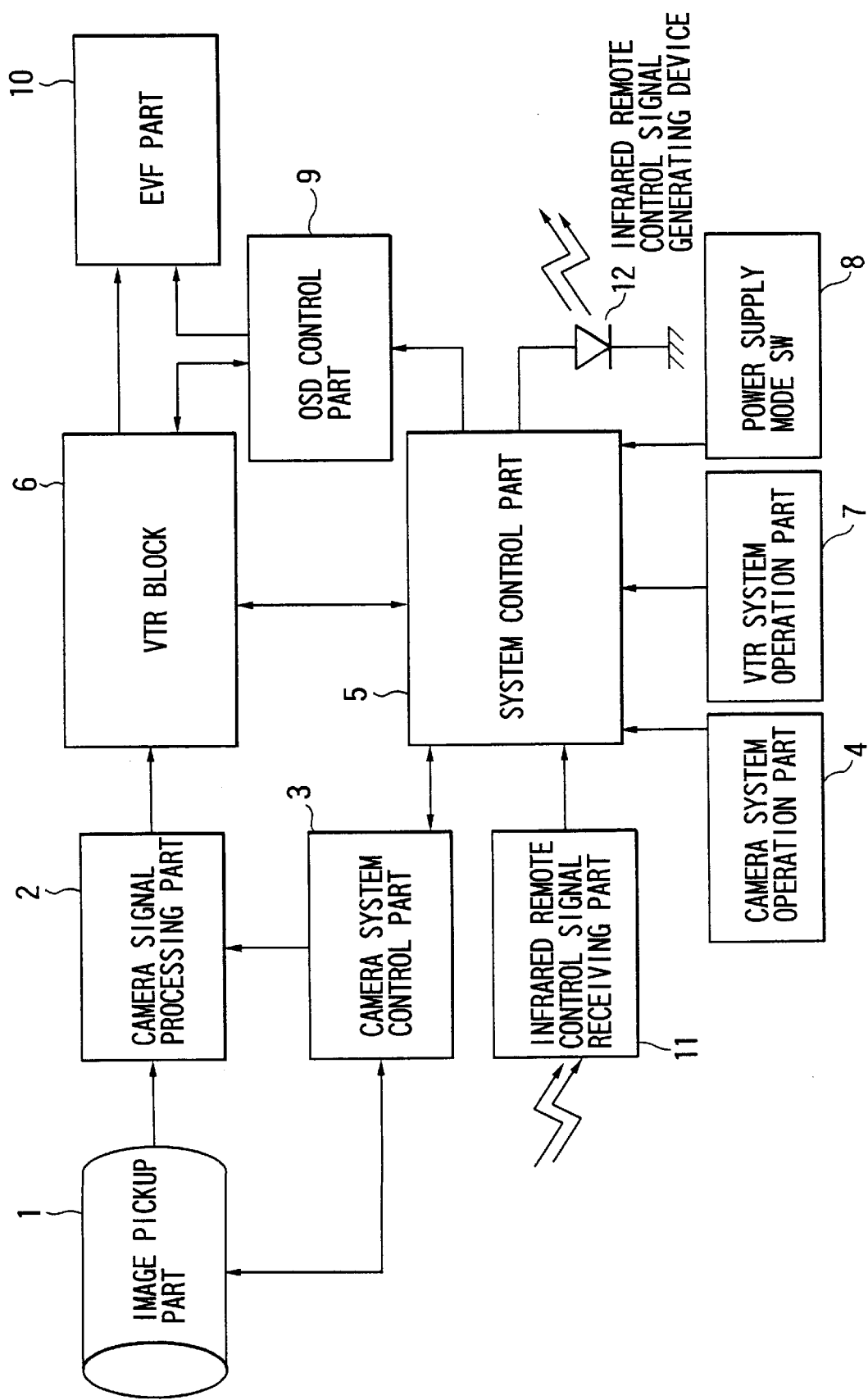
FIG. 1 is a block diagram showing in outline the arrangement of a camera-integrated type VTR arranged according to the invention as an embodiment thereof.

FIG. 1 is a block diagram showing in outline the arrangement of a camera-integrated type VTR to which the invention is applied as an embodiment thereof.

Referring to FIG. 1, an image pickup part 1 is composed of an image pickup optical system, an image sensor, an automatic focusing mechanism, a zoom mechanism, etc. The image pickup part 1 is arranged to adjust the focus on an object of shooting of the image pickup optical system, the quantity of light, etc., according to control signals from a camera system control part 3, to convert an optical image thus obtained through the image pickup optical system into a video signal and to supply the video signal to a camera signal processing part 2. The camera signal processing part 2 is arranged to perform a signal processing action on the video signal outputted from the image pickup part 1 in accordance with a control signal from the camera system control part 3 and to supply the processed video signal to a VTR block 6.

The VTR block 6 is composed of a video-and-audio signal processing part, a rotary head, a magnetic tape transport mechanism part for a magnetic tape employed as a recording medium, a driving part provided for driving the mechanism part, a servo control part for servo control over the driving part, etc. The VTR block 6 is arranged to record and reproduce a video signal on and from the magnetic tape according to a control signal outputted from a system control part 5. The video signal reproduced from the magnetic tape is supplied, for example, to another apparatus from an outside output terminal (not shown) as well as to an EVF (electronic viewfinder) part 10.

An OSD (on-screen display) control part 9 is arranged to generate a character image signal for on-screen display in accordance with a control signal and data from the system control part 5 and supplies the character image signal to the EVF part 10 so as to inform the operator of information of various kinds. The OSD control part 9 is also arranged to generate information signals for a title, a date, etc., to be superimposed on the video signal to be recorded or on the reproduced video signals and to supply the information signals to the VTR block 6. The OSD control part 9 is further arranged to output, through the VTR block 6 and the outside output terminal (not shown), and supply to the other apparatus the information of various kinds about the state of the body of the VTR, such as the characters and symbols to be displayed at the EVF part 10 and also a character image signal for on-screen display indicating a guide indication to be used in setting a menu, as will be described later herein. The EVF (electronic viewfinder) part 10 is provided with a CRT or a liquid crystal display panel for displaying video images. The EVF part 10 is thus arranged not only to show video images represented by the picked-up or reproduced video signals but also the images of the character image signals for an on-screen display supplied from the OSD control part 9 and indicating information of various kinds about the state of the body of the VTR in characters and symbols and also a guide indication to be made in setting a menu.

The system control part 5 includes among others a microcomputer which controls in an overall manner various functions of the camera-integrated type VTR in the first embodiment of the invention. The system control part 5 has various functions including a timer function. In the case of the embodiment, these functions include power supply mode control, control over the transition of operating modes of the VTR block 6 from one mode to another, control over the display of information of various kinds, control of an editing mode and storing and holding shooting modes and editing programs. Further, the system control part 5 is provided with a nonvolatile memory element such as an EEPROM or the like or a nonvolatile memory element such as an SRAM or the like which is backed up by a battery, so that data of various kinds can be retained even in the event of cutoff of the power supply of the apparatus.

An infrared remote control signal generating device 12 is arranged to output a control signal from the system control part 5 as an infrared remote control signal for a remote operation on another apparatus employed as a recording device. An infrared remote control signal receiving part 11 is arranged to receive an infrared remote control signal transmitted from a remote control device which is not shown and to supply the system control part 5 with control data codes indicated by the infrared remote control signal received.

A camera system operation part 4 is composed of switches and dials of various kinds related to the camera system and provided for turning on or off of an automatic focusing (AF) function, automatic/lock switching of automatic exposure control (AE), selection of a programmed AE, etc. When the camera system operation part 4 is operated by the operator, information on the operated state of the operation part 4 is transferred from the system control part 5 to the camera system control part 3. The camera system control part 3 is composed of a microcomputer etc., and is arranged to control the whole camera system in accordance with instructions received from the system control part 5 and from the camera system operation part 4.

A VTR system operation part 7 is composed of switches of various kinds related to the VTR system and the whole apparatus, including, for example, "ON SCREEN", "UP", "DOWN", "RIGHT", "LEFT", "EXECUTE", "MENU", "PLAY", "FF/REW", "STOP" and "START/STOP" switches. The VTR system operation part 7 is thus arranged to supply the system control part 5 with information on instructions given by the operator.

A power supply mode switch 8 is provided for selection of one of the power supply modes of the VTR body, including "camera", "VTR", "editing" and "off" modes. The system control part 5 reads the state of the power supply mode switch 8 and sets the power supply mode and the operation mode of the camera part and that of the VTR part to predetermined modes accordingly.

Figure 2:
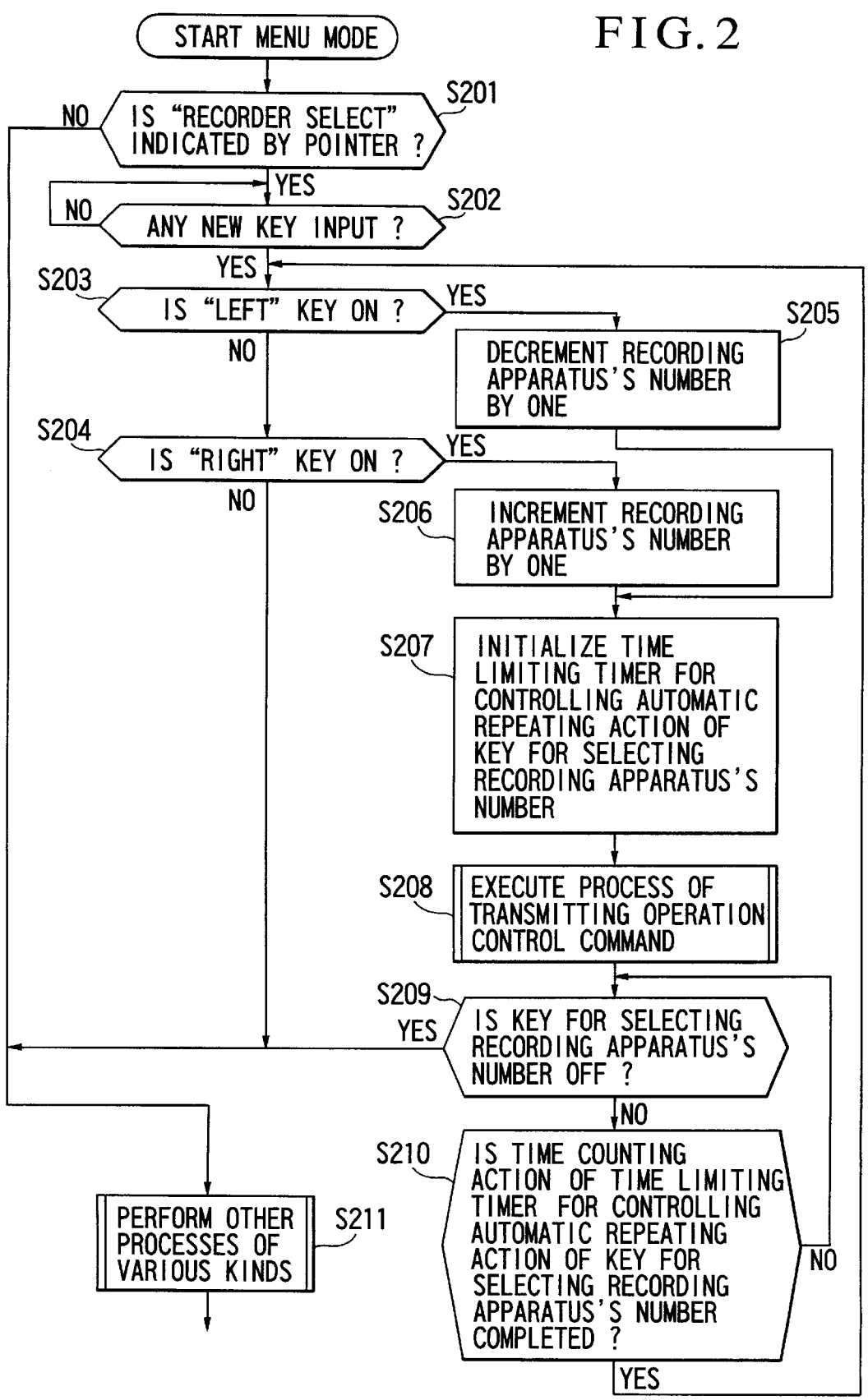
FIG. 2 is a flow chart showing an operation in a menu mode of the camera-integrated type VTR shown in FIG. 1.

FIG. 2 is a flow chart showing an operation in a menu mode of the camera-integrated type VTR in the embodiment shown in FIG. 1. In the case of the embodiment, the kind of action control commands to be sent to the other apparatus as a recording apparatus connected to the camera-integrated type VTR is set in the menu mode.

Figure 3:
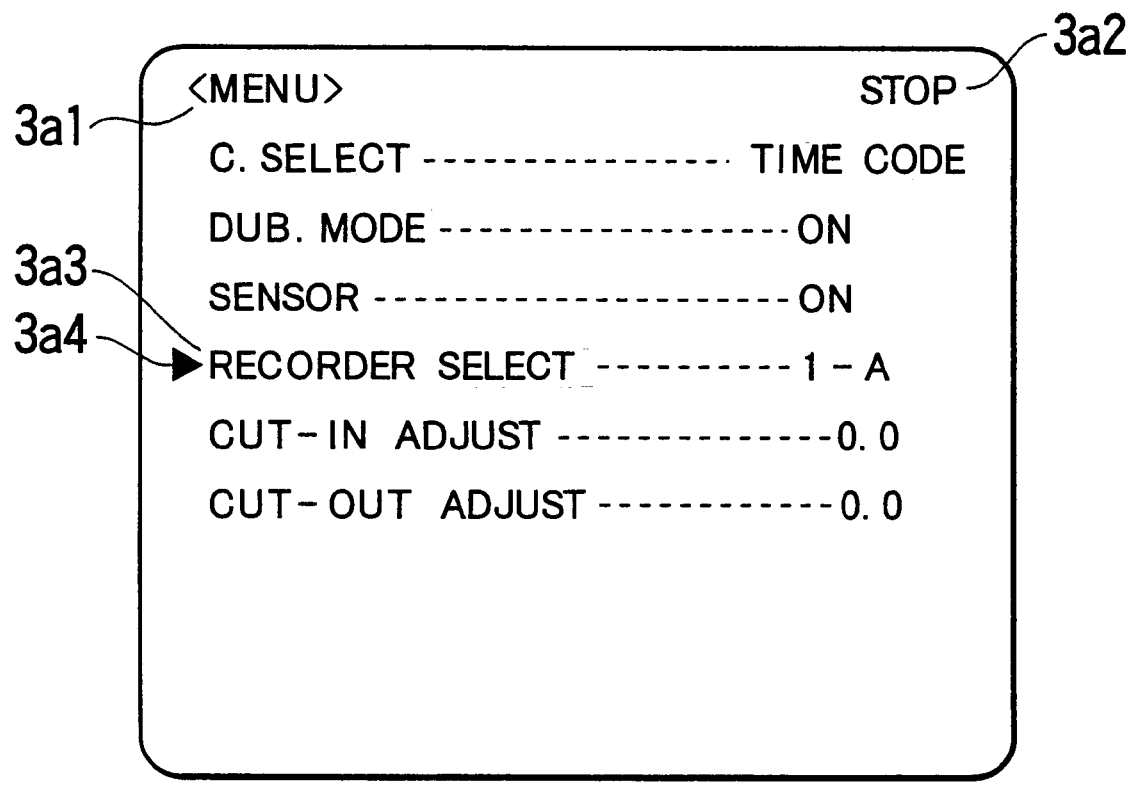
FIG. 3 shows by way of example a menu display picture obtained when the camera-integrated type VTR shown in FIG. 1 is in the menu mode.

FIG. 3 shows by way of example a menu display picture provided on the display image plane of the EVF part 10 in the menu mode. Referring to FIG. 3, there are displayed an indication 3a1 indicating that the whole camera-integrated type VTR is in the menu mode, an indication 3a2 indicative of the operating state of the VTR system, and an indication 3a3 provided for selection of the kind of action control commands to be sent to the other apparatus as a recording apparatus connected to the camera-integrated type VTR and thus indicating the kind of the other apparatus (recording apparatus) corresponding to the selected kind of action control commands. In the case of the embodiment, a plurality of numbers indicative of different kinds of other apparatuses are displayed in rotation in a predetermined sequence. Further, there is also displayed a pointer indication 3a4 arranged to point at an item which is currently in process of being set in the display picture during the menu mode. Thus, in the display picture shown in FIG. 3, the pointer indication 3a4 which is located currently at an item "RECORDER SELECT" indicates that action control commands of the kind applicable to a recording apparatus No. "1-A" are currently being selected as the action control commands to be sent to the other apparatus.

Referring to FIG. 2, in the menu mode, at a step S201, a check is made to find if the pointer is pointing at a process of selecting the kind of the other apparatus (the item "RECORDER SELECT" in FIG. 3). If so, the flow of operation proceeds to a step S202 to be in a standby state until a new key input operation is performed. If not, the flow proceeds to a step S211 perform processes of other kinds, which are omitted from the description.

When a new key input operation is detected at the step S202, the flow proceeds to a step S203 to find if the key input operation has been performed on the "LEFT" key of the VTR system operation part 7. If not, the flow proceeds to a step S204 to find if the key input operation has been performed on the "RIGHT" key of the VTR system operation part 7.

If the "LEFT" key input is found at the step S203 to have been performed, the flow proceeds to a step S205 to decrement by one the number indicative of the kind of the other apparatus (recording apparatus). If the "RIGHT" key input operation is found to have been performed at the step S204, the flow proceeds to a step S206 to increment by one the number indicative of the kind of the other apparatus (recording apparatus). If neither of the key input operations is found at the steps S203 and 204 as to have been operated, the flow proceeds to the step S211 to execute the processes of other kinds.

After the number indicative of the other apparatus is updated, that is, after a new number is selected for the other apparatus (recording apparatus), at the step S205 or S206 as mentioned above, the flow proceeds to a step S207. At the step S207, in order to control an action of automatically repeating the "LEFT" or "RIGHT" key input operation (an action of treating a continuous pushed state of any operation key as a continuous repeating operation on the key), the setting of a time limiting timer set by the system control part 5 by itself is initialized and the time limiting timer is caused to start a countdown process. The length of time to be measured by the time limiting timer is set to be long enough for a verifying action for finding if the action control command code selected by the "LEFT" or "RIGHT" key input operation in the menu mode is suited for the other apparatus (recording apparatus) actually connected to the camera-integrated type VTR to be completed on any one of various kinds of action control command codes (the length of time is set to be longer than the length of time to be set in a time limiting timer for an ordinary automatic repeating action on a key input operation).

As described above, the length of time to be measured by the time limiting timer for control over the automatic repeating action, when the "LEFT" or "RIGHT" key input operation is performed for selecting the number of the other (recording) apparatus, is arranged to be long enough for the action of verifying and finding if the action control command code selected is suited for the other apparatus actually connected to the camera-integrated type VTR to be completed on any one of various kinds of action control command codes. In other words, such an arrangement solves the following problem of prior art. In continuously selecting the number assigned to the other apparatus by the "LEFT" or "RIGHT" key input operation, if the length of time to be measured by the time limiting timer is short, the verifying action which must be carried out every time one number of the other apparatus is selected would become impossible because another number of the other apparatus would be selected before completion of the verifying action. Under such a condition, it is hardly possible to adequately select the action control commands to be sent to the other (recording) apparatus connected to the camera-integrated type VTR. The arrangement according to the embodiment of the invention, on the other hand, permits the selecting action to be continuously performed on the action control commands to be sent to the other apparatus.

Again referring to FIG. 2, after the step S207, the flow of operation proceeds to a step S208. At the step S208, in order to verify and find whether or not the action control command code corresponding to the number of the other (recording) apparatus newly selected is suited for the other apparatus actually connected to the camera-integrated type VTR to permit an accurate remote operation on the other apparatus, an infrared remote control signal indicating an action control command for commanding a predetermined action in the action control command code is repeatedly transmitted several times from the infrared remote control signal generating device 12. Since this action of sending the action control command is arranged to be performed in parallel to other actions, the flow proceeds to the next step S209 as soon as the processing action of the step S208 begins.

At the step S209, a check is made to find if the "LEFT" or "RIGHT" key input operation has been canceled. If so, the flow proceeds to the step S211 to temporarily bring the action control command selecting action to an end. If not, the flow proceeds to a step S210.

At the step S210, in order to control the automatic repeating action on the above-stated "LEFT" or "RIGHT" key input operation, this key input operation is monitored in the process of the automatic repeating action until the count action of the time limiting timer set by the system control part 5 comes to an end. When the end of the count action of the time limiting timer is confirmed, the flow of operation returns to the step S203 to repeat the steps S203 to S210 as described above.

The above-stated procedures of the camera-integrated type VTR according to the embodiment of the invention permits selection of action control commands to be sent to the other apparatus connected as a recording apparatus to the camera-integrated type VTR in a continuous manner at intervals of a predetermined length of time which enables the operator to verify whether or not each action control command code selected for the action control commands from among action control command codes corresponding to numbers assigned to different recording apparatuses is suited for the other (recording) apparatus actually connected to the camera-integrated type VTR to permit an accurate remote operation on the other apparatus. In particular, an advantageous feature of the embodiment resides in the following point. In some cases, the kind of the action control command code applicable to the other (recording) apparatus is unknown, such as in a case where the manufacturer of the other (recording) apparatus is unknown or where, although the manufacturer is known, the action control command codes of one and the same manufacturer are divided into a plurality of categories and the action control command codes for different kinds of products belong respectively to different categories which may be expressed, for example, as "A Company - 1", "A Company - 2", "A Company - 3", "A Company - 4", ". . . ". Even in such a case, the arrangement of the embodiment permits selection of the action control commands to be sent to the other (recording) apparatus connected to the camera-integrated type VTR to be carried out accurately, by continuously operating the "LEFT" or "RIGHT" key and detaching a finger from the key to suspend the key input operation when the other apparatus begins performing a predetermined action. Thus, the kind of the action control command code applicable to the other apparatus can be easily selected and automatically decided when the key input operation is suspended in this manner.

As described above, in accordance with the embodiment of the invention, there is provided a reproducing apparatus capable of solving the problems of the prior art and having an editing function arranged to permit selection of an action control command to be sent to another apparatus connected to the reproducing apparatus, in a simple manner without any complex, troublesome operation.

I claim:

1. A reproducing apparatus having an editing function of editing, by using another apparatus which is remotely controllable, a signal recorded on a recording medium, comprising:

(A) reproducing means for reproducing a signal recorded on the recording medium loaded on said reproducing apparatus and for outputting the reproduced signal to the other apparatus;

(B) control command transmitting means for storing a plurality of kinds of action control command codes corresponding respectively to manufacturers or kinds of apparatuses usable as the other apparatus and used to remotely control the other apparatus, for selecting one kind of action control command code from the plurality of action control command codes, and for transmitting, to the other apparatus, action control commands for remotely controlling the other apparatus in accordance with the selected action control command code; and (C) control means having (i) an editing program execution control mode of allowing at least one editing program to be set, storing beforehand the set editing program, controlling said reproducing means to reproduce the signal recorded on the recording medium in accordance with the stored editing program, and controlling said control command transmitting means to perform an editing recording action in accordance with the stored editing program by using the remotely operable other apparatus, and (ii) an action control command selection mode of, when action control commands applicable to the other apparatus connected to said reproducing apparatus to be transmitted by said control command transmitting means are to be selected from a plurality of kinds of action control commands transmittable by said control command transmitting means, causing said control command transmitting means to serially and continuously select the plurality of kinds of action control command codes one after another at intervals of a constant period of time sufficiently long for verifying whether the selected action control command code is applicable to the other apparatus connected to said reproducing apparatus to perform an accurate remote control over the other apparatus, and to automatically a plurality of times transmit an action control command for commanding a predetermined action in each of the plurality of kinds of action control command codes during the period of each selection, and arranged to make an editing action executable in accordance with the editing program execution control mode after selecting action control commands to be transmitted to the other apparatus connected to said reproducing apparatus in accordance with the action control command selection mode.

2. A reproducing apparatus according to claim 1, wherein the action control command code is a code used for remotely controlling pause of a recording action and cancellation of the pause of the recording action of a recording apparatus usable as the other apparatus.

3. A reproducing apparatus according to claim 1, wherein the editing program is a program for designating an editing start point and an editing end point of the recording medium on which the signal to be edited is recorded.

4. A reproducing apparatus according to claim 3, wherein said reproducing means is arranged to perform such an editing action as to search for the editing start point of the recording medium and start and stop a reproducing action in accordance with a program concerning the editing start point and the editing end point of the recording medium designated by the editing program.

5. A reproducing apparatus having an editing function of editing, by using another apparatus which is remotely controllable, a signal recorded on a recording medium, comprising:

(A) reproducing means for searching for a desired video signal recorded on the recording medium loaded on said reproducing apparatus, reproducing the searched-for video signal and outputting the reproduced video signal to the other apparatus;

(B) control command transmitting means for storing a plurality of kinds of action control command codes corresponding respectively to manufacturers or kinds of apparatuses usable as the other apparatus and used to remotely control the other apparatus, for selecting one kind of action control command code from the plurality of action control command codes, and for transmitting, to the other apparatus, action control commands for remotely controlling the other apparatus in accordance with the selected action control command code;

(C) control means having (i) an editing program execution control mode of allowing at least one editing program to be set, storing beforehand the set editing program, controlling said reproducing means to reproduce the signal recorded on the recording medium in accordance with the stored editing program, and controlling said control command transmitting means to perform an editing recording action in accordance with the stored editing program by using the remotely operable other apparatus, and (ii) an action control command selection mode of, when action control commands applicable to the other apparatus connected to said reproducing apparatus to be transmitted by said control command transmitting means are to be selected from a plurality of kinds of action control commands transmittable by said control command transmitting means, causing said control command transmitting means to serially and continuously select the plurality of kinds of action control command codes one after another at intervals of a constant period of time sufficiently long for verifying whether the selected action control command code is applicable to the other apparatus connected to said reproducing apparatus to perform an accurate remote control over the other apparatus, and to automatically a plurality of times transmit an action control command for commanding a predetermined action in each of the plurality of kinds of action control command codes during the period of each selection, and arranged to make an editing action executable in accordance with the editing program execution control mode after selecting action control commands to be transmitted to the other apparatus connected to said reproducing apparatus in accordance with the action control command selection mode; and (D) display means for displaying a video image represented by the video signal outputted from said reproducing means, information of various kinds related to an editing program to be executed by said control means and information of various kinds related to an operating state of said reproducing means.

6. A reproducing apparatus according to claim 5, wherein the action control command code is a code used for remotely controlling pause of a recording action and cancellation of the pause of the recording action of a recording apparatus usable as the other apparatus.

7. A reproducing apparatus according to claim 5, wherein the editing program is a program for designating an editing start point and an editing end point of the recording medium on which the signal to be edited is recorded.

8. A reproducing apparatus according to claim 7, wherein said reproducing means is arranged to perform such an editing action as to search for the editing start point of the recording medium and start and stop a reproducing action in accordance with a program concerning the editing start point and the editing end point of the recording medium designated by the editing program.

9. A reproducing apparatus according to claim 5, wherein said display means is arranged to cause information images indicating the information of various kinds related to the editing program to be executed by said control means and the information of various kinds related to the operating state of said reproducing means to be displayed in a state of being superimposed on the video image represented by the video signal outputted from said reproducing means.

10. A recording and reproducing apparatus arranged to pick up an image of an object and to record a video signal corresponding to the picked-up object image on a recording medium, and having an editing function of editing, by using another apparatus, a video signal recorded on the recording medium, comprising:

(A) image pickup means for picking up the object image and outputting the video signal corresponding to the picked-up object image;

(B) recording and reproducing means for recording the video signal outputted from said image pickup means on the recording medium loaded on said recording and reproducing apparatus, and for searching for a desired video signal recorded on the recording medium, reproducing the searched-for video signal and outputting the reproduced video signal to the other apparatus;

(C) control command transmitting means for storing a plurality of kinds of action control command codes corresponding respectively to manufacturers or kinds of apparatuses usable as the other apparatus and used to remotely control the other apparatus, for selecting one kind of action control command code from the plurality of action control command codes, and for transmitting, to the other apparatus, action control commands for remotely controlling the other apparatus in accordance with the selected action control command code;

(D) control means having (i) an editing program execution control mode of allowing at least one editing program to be set, storing beforehand the set editing program, controlling said recording and reproducing means to reproduce the signal recorded on the recording medium in accordance with the stored editing program, and controlling said control command transmitting means to perform an editing recording action in accordance with the stored editing program by using the remotely operable other apparatus, and (ii) an action control command selection mode of, when action control commands applicable to the other apparatus connected to said recording and reproducing apparatus to be transmitted by said control command transmitting means are to be selected from a plurality of kinds of action control commands transmittable by said control command transmitting means, causing said control command transmitting means to serially and continuously select the plurality of kinds of action control command codes one after another at intervals of a constant period of time sufficiently long for verifying whether the selected action control command code is applicable to the other apparatus connected to said recording and reproducing apparatus to perform an accurate remote control over the other apparatus, and to automatically a plurality of times transmit an action control command for commanding a predetermined action in each of the plurality of kinds of action control command codes during the period of each selection, and arranged to make an editing action executable in accordance with the editing program execution control mode after selecting action control commands to be transmitted to the other apparatus connected to said recording and reproducing apparatus in accordance with the action control command selection mode; and (E) display means for displaying a video image represented by the video signal outputted from said image pickup means or a reproduced video image represented by the video signal outputted from said recording and reproducing means, information of various kinds related to an editing program to be executed by said control means and information of various kinds related to an operating state of said recording and reproducing means.

11. A recording and reproducing apparatus according to claim 10, wherein the action control command code is a code used for remotely controlling pause of a recording action and cancellation of the pause of the recording action of a recording apparatus usable as the other apparatus.

12. A recording and reproducing apparatus according to claim 10, wherein the editing program is a program for designating an editing start point and an editing end point of the recording medium on which the signal to be edited is recorded.

13. A recording and reproducing apparatus according to claim 12, wherein said recording and reproducing means is arranged to perform such an editing action as to search for the editing start point of the recording medium and start and stop a reproducing action in accordance with a program concerning the editing start point and the editing end point of the recording medium designated by the editing program.

14. A recording and reproducing apparatus according to claim 10, wherein said display means is arranged to cause information images indicating the information of various kinds related to the editing program to be executed by said control means and the information of various kinds related to the operating state of said recording and reproducing means to be displayed in a state of being superimposed on the video image represented by the video signal outputted from said image pickup means or the reproduced video image represented by the video signal outputted from said recording and reproducing means.

* * * * *

UNITED STATES PATENT AND TRADEMARK OFFICE
CERTIFICATE OF CORRECTION

PATENT NO. : 5,897,216
DATED : April 27, 1999
INVENTOR(S) : Hiroaki Furuyama

It is certified that error appears in the above-identified patent and that said Letters Patent is hereby corrected as shown below:

Col. 1, line 59, after "quite" insert --a--.

Col. 6, line 22, after "S211" insert --to--.

Signed and Sealed this

Fourteenth Day of March, 2000

Attest:

Q. TODD DICKINSON

Attesting Officer

Commissioner of Patents and Trademarks